United States Patent [19]

Getgen

[11] 3,865,988

[45] Feb. 11, 1975

[54] PULSE TRAIN WAVE SHAPING MEANS AND METHOD

[75] Inventor: Lawrence E. Getgen, Redwood City, Calif.

[73] Assignee: GTE Automatic Electric Laboratories Incorporated, Northlake, Ill.

[22] Filed: July 5, 1973

[21] Appl. No.: 376,488

[52] U.S. Cl. .............................................. 179/15 AA
[51] Int. Cl. ................................................ H04j 3/00
[58] Field of Search ................................ 179/15 AA

[56] References Cited

UNITED STATES PATENTS 3,366,738 1/1968 Feder ............................. 179/15 AA
3,641,271 2/1972 Fettweis ......................... 179/15 AA

*Primary Examiner*—Ralph D. Blakeslee
*Attorney, Agent, or Firm*—Leonard R. Cool; Russel A. Cannon; T. C. Jay, Jr.

[57] ABSTRACT

A circuit for shaping pulses of a pulse train into preferred waveforms for transmission which includes an energy storage device for receiving the pulse train, a wave shaping filter for outputting the preferred waveform, the filter being compatible with the storage device for operation in a resonant transfer mode, and resonant transfer means connecting the storage device and the shaping filter.

23 Claims, 10 Drawing Figures

PULSE TRAIN WAVE SHAPING MEANS AND METHOD

BACKGROUND OF THE INVENTION

The invention relates to communication systems and to circuit means for shaping pulses of pulse trains into waveforms for transmission.

In communication systems, a message signal may be converted into a binary code providing a pulse train containing the information in the original message signal. The pulses in the binary code are in reality square waves of short duration. However, a square wave has sharp edges and transitions and, therefore, requires a significant contingent of high frequency components which are a limiting factor insofar as conveying the information over a transmission line is concerned. In such cases, the pulse train is commonly converted into more rounded waveforms requiring less bandwidth. The latter waveforms are commonly used in the transmission of data and PCM signals which signals may be in binary, duobinary or bipolar form.

For baseband data transmission, the conversion of the pulse train into the more rounded waveforms to obtain binary or duobinary signals is often accomplished by applying the pulse train to a shaping filter. The design of such a filter is quite difficult since it must have impulse response zeros at multiples of the pulse clock frequency and, in addition, it must be shaped to take into account the fact that the pulse input is not an impulse, but is a square wave signal.

An impulse is defined mathematically as a pulse of zero width and infinite amplitude and unit area. Thus, a true impulse cannot be obtained in practice. However, it may be approximated by a pulse of relatively high amplitude and short duration. Such an approximation of an impulse would contain a uniform frequency content over the frequency range of interest. It is important to note that if the pulses are long with respect to the practical impulse width that the frequency content of a pulse will not adequately approximate the uniform frequency content over the desired range of interest. Therefore, where long pulses are used, network compensation must be added. On the other hand, if the pulses are first converted to impulses and then passed through a shaping filter, as is well known, then the amplitude of the transmission signal, i.e., binary, duobinary, etc., will be attenuated in relation to $t$ divided by T, where $t$ is the time duration of the impulse and T is the period of the pulse train.

For PCM the pulse train is often converted into bipolar form to facilitate transmission. Generation of such bipolar waveforms may be accomplished by means of:

a. a logic driven flip-flop coupled to the transmission medium by means of a transformer, see FIG. 4 of U.S. Pat. No. 2,996,578, or b. blocking oscillators coupled to the transmission medium by means of a transformer, see FIGS. 6, 7, and 8 of U.S. Pat. No. 2,996,578.

As hereinabove noted, one of the principal difficulties with the usual methods of preparing pulse trains for baseband transmission is in the design of the wave shaping filter. As noted hereinabove, such designs must take into account the desired response of the filter to an impulse. In addition, these filters must be constructed to account for input signals which are pulses too wide to be regarded as impulses. On the other hand, if the pulses are sufficiently narrow to be regarded as impulses, gain must normally be added to account for the loss of output power corresponding to the narrow pulse width.

For PCM transmission one of the principal disadvantages of prior-art methods is the expense involved in generating the bipolar waveform. This is due to the use of transformers and blocking oscillators and attendant components. Also, the output waveform is essentially uncontrolled and unsuitable for bipolar transmission. Additionally, considerably bandwidth is required for conventional bipolar waveforms.

A further difficulty is the multiplexing of these waveforms since an additional step is necessary which step most generally involves a form of modulation.

SUMMARY OF INVENTION

The present invention avoids the principal disadvantages of prior-art structures by the use of an energy storage device for receiving the pulse train to be transmitted; a wave shaping filter which, in accordance with the present invention, is compatible with the energy storage device for operation in a resonant transfer mode; and a resonant transfer structure connecting the storage device to the wave shaping filter to transfer the entire pulse energy as an impulse to the shaping filter for outputting the desired waveform for transmission. A resonant transfer structure provides important advantages. The first is that the total energy in the data pulse is stored in the energy storing device and is transferred in toto virtually instantaneously to the wave shaping filter so as to provide the closest possible approximation of an instantaneous impulse at the input of the filter. Thus, the storage device provides an ideal vehicle for accumulating the total energy contained in a "fat" square wave, and the resonant circuit phenomenon provides an essentially lossless transfer of this energy in the form of the instantaneous impulse impressed upon the input of the wave shaping filter. Resonant transfer techniques are well known. For a discussion of a technique which provides the advantages desired, reference should be made to my copending application, Electric Resonant Transfer Filter and Method, filed Mar. 2, 1973, Ser. No. 337,616.

The second important advantage of the resonant transfer structure is that the current impulse response waveform of the output filter in itself approaches the ideal waveform for transmission. Thus, the output filter of the resonant transfer strucure may itself be used as the wave shaping filter, and all that is required is that the output filer be compatible with the input energy storage device for operation in the resonant transfer mode. Inherently, such a filter when selected in accordance with the present invention, will also have the required current impulse response zeros at multiples of the sampling frequency. Thus, an object of the present invention is to provide a pulse train wave shaping means of the character described which is of simple and low-cost design and yet will output clean signals having sufficient separation between logic levels for extraction of both the message encoded in the waveform and the pulse clock or periodicity with which the wavform was originally endowed.

Another object of the present invention is to provide a wave conversion apparatus of the character described which may be used for converting pulse trains into binary, duobinary, and bipolar waveforms for transmission.

A further object of the present invention is to provide a pulse data train waveform conversion apparatus of the character above which is composed of a minimum number of relatively inexpensive and readily obtainable parts arranged in an all solid-state circuit which can be expected to provide long life and dependable, trouble-free operation.

A still further object of the invention is to provide a simple way in which a number of pulse trains can be multiplexed. Each pulse train is applied to a separate wave shaping circuit and each circuit will have a wave shaping filter which will pass only the frequencies of interest.

The invention possesses other objects and features of advantage, some of which will be set forth in the following description of the preferred forms of the invention which are illustrated in the drawings accompanying and forming part of this specification. It is to be understood, however, that variations in the showing made by the said drawings an description may be adopted within the scope of the invention as set forth in the claims.

Referring to said drawings

Figure 1:
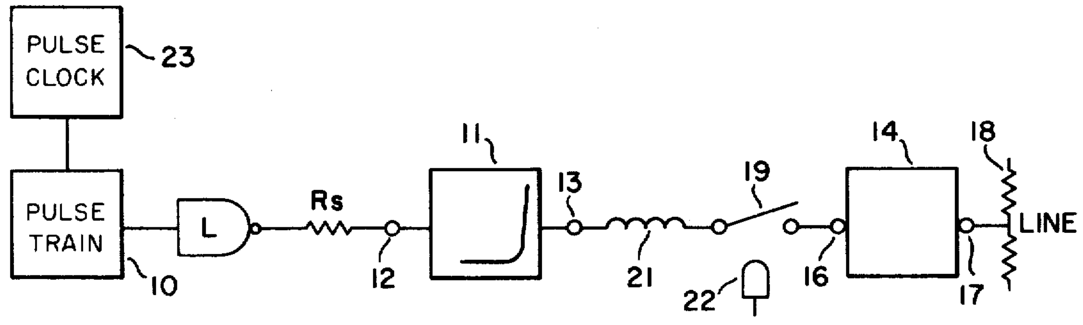
FIG. 1 is a basic circuit embodying the present invention.

The basic circuit for the various embodiments of the present invention are illustrated in FIG. 1. The pulse train 10 which is to be converted to a binary, duobinary or three-level signal, or bipolar pulse train is fed into the circuit, FIG. 1, from the left of the view, and is shown generally at line B of FIG. 7. The pulse train is such as to drive an amplifier or logic gate L on and off in accordance with whether or not the input is a logic zero or one. Such amplifier or gate L may be incorporated in the present apparatus or may be included in the conventional pulse train generating portion of the system.

The improvement of the present invention comprises briefly an energy storage device 11 having an input 12 adapted for connection to the pulse train and an output 13; a waVe shaping filter 14 compatible with device 11 for operation in a resonant transfer mode and having an input 16 and an output 17 adapted for connection to a transmission line 18; a gate 19 and resonant transfer inductor 21 connecting output 13 of device 11 to input 16 of filter 14; and driving means 22 for periodically closing and opening gate 19 at a sampling frequency to periodically transfer energy stored in device 11 as impulses to filter input 16. While a number of circuits may be employed to provide the gate driving means, one such circuit arrangement is described in my copending application, Time Division Hybrid Circuit and Method, filed Apr. 9, 1973, Ser. No. 349,572.

Amplifier or gate L is arranged to have an output impedance $R_s$ to match the input impedance of device 11. As a feature of the present invention, filter 14 only needs be designed for operation in the resonant transfer mode compatible with device 11. This may be done by any one of several methods well known in the art and reference has been made, hereinabove, to one such method. Such a filter inherently provides desired wave shaping. No additional response shaping design or components is required. Conventionally, such filters have a three dB cut-off at one-half of the sampling frequency and will have current impulse response zeros at multiples of the sampling frequency.

The operation of the present apparatus may be explained as follows. It is the purpose of filter 11 to bandlimit the pulse train applied to the filter at 12 so that the filter output 13 meets the Nyquist criterion in respect to the frequency of operation, $F_s$, of the sampling gate 19. For instance if the sampling gate is operated at a rate $F_s$ = 8 kHz, the 3-dB cut-off frequency of filter 11 is 4 kHz. In addition, it is necessary that filter 11 be designed to operate in the resonant transfer mode with filter 14.

Although filter 11 bandlimits its input signal so that the output signal 13 meets the Nyquist criteria, it is of interest to discuss both the case where the input data signal 10 contains a frequency component below the Nyquist rate — that is a frequency equal to or less than $F_s/2$ — and the case where the data signal contains only frequencies greater than $F_s/2$. The first instance is associated with binary and with bipolar transmission. The second has to do with duobinary transmission.

Considering, first, the case of binary transmission. The gate clock rate $F_s = 1/T_s$ is as shown in FIG. 5(A). The pulse clock interval is arbitrary as long as it is not less than two of the gate clock intervals $T_s$. The shortest allowable pulse clock interval $T_D = 2T_s$ is indicated in FIG. 5(B). This follows from the sampling theorem Nyquist criterion discussed hereinabove. A resonant transfer circuit was set up to operate at a pulse clock rate of 3.5 kHz for an $F_s$ = 8 kHz rate. The pulse clock and the sampling rate were asynchronous but operated correctly since the sampling theorem criterion was met. Although the pulse train will, in general, be an arbitrary pattern, a particular pulse train pattern here shown, a non-return to zero NRZ pulse train, is depicted in FIG. 5(C). This pattern is that of alternating ones and zeros. The reason for using this choice for illustration is that it contains the highest frequency fundamental components possible with the pulse clock rate depicted in FIG. 5(B).

The fundamental frequency component of the pulse train is shown in FIG. 5(D). This signal is sinusoidal in respect to the mean or dc value of the pulse train. It is the signal of FIG. 5(D) which is sampled by the resonant transfer gate. The samples are indicated in FIG. 5(E).

The samples of FIG. 5(E) are applied to filter 14 using resonant transfer techniques. There are several reasons for using resonant transfer. One reason is that there is little energy loss in the resonant transfer process so that the energy in the line signal at 18 is essentially that contained in the signal at the output 13 of filter 11. The second reason for using resonant transfer is that pulse signals suitable for transmission must have an impulse response such that amplitude zeros occur at the sampling interval. This response is inherent in resonant transfer filters of the "impulse response zero" type such as:

a. the raised-cosine filter described by Bennett, W. R. and Davey, "Data Transmission," McGraw-Hill, 1956;
b. the folded −R(ω) filter presented by Gibbs, A., "Design of a Resonant Transfer Filter," IEEE Trans, Ckt. Th. CT–13, pp. 392–398, Dec. 1966;
c. or the resonant transfer filter of Thomas, G., "Synthesis of Input and Output Networks for a Resonant Transfer Gate," IRE Int. Conv. Record, pp. 236–243, 1961.

Therefore, many designs and design techniques are readily available for suitable filters. Another and important advantage as hereinabove noted is the impression of the signal on the wave-shaping filter as a full-strength instantaneous impulse.

It should be noted that the foregoing advantages are not found in nonresonant transfer methods. However, the impulse response requirements must still be met even though the input pulse does not approximate an impulse. Therefore, the filter design, in previous systems, must include compensation for the fact that the signal is a full-width pulse, not an impulse. Such designs are more complicated and of a less general nature than for resonant transfer filters.

As hereinabove noted, device 11 comprises a lowpass filter so as to limit the frequency input to the resonant transfer mechanism in accordance with the Nyquist theorem. Accordingly, driving means 22 for gate 19 is operated to periodically close gate 19 for the requisite period for the resonant transfer of energy and to periodically close and open the gate at a sampling frequency of at least twice the highest frequency of interest being transmitted in the system (for the binary and bipolar signals).

As a feature of the present invention, binary and duobinary signals will be selectively obtained by controlling the clock frequency of the pulse train, shown diagrammatically in FIG. 1, by pulse clock means 23. Where the pulse clock fequency is no greater than one-half of the sampling frequency of gate 19, binary signals are obtained. These may be further converted into bipolar signals by the mechanism illustrated in FIG. 4. On the other hand, where the pulse clock frequency is equal to the sampling frequency of gate 19, duobinary signals are obtained.

Figure 2:
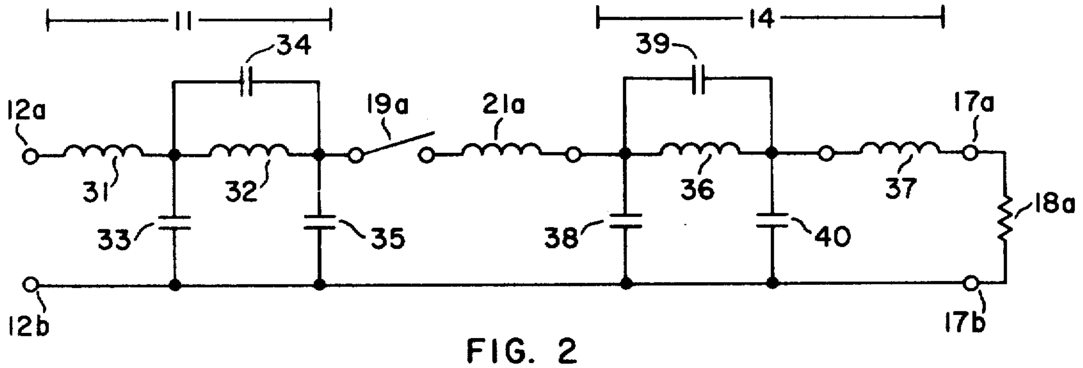
FIG. 2 is an electrical diagram of a portion of the circuit illustrated in FIG. 1.
Figure 3:
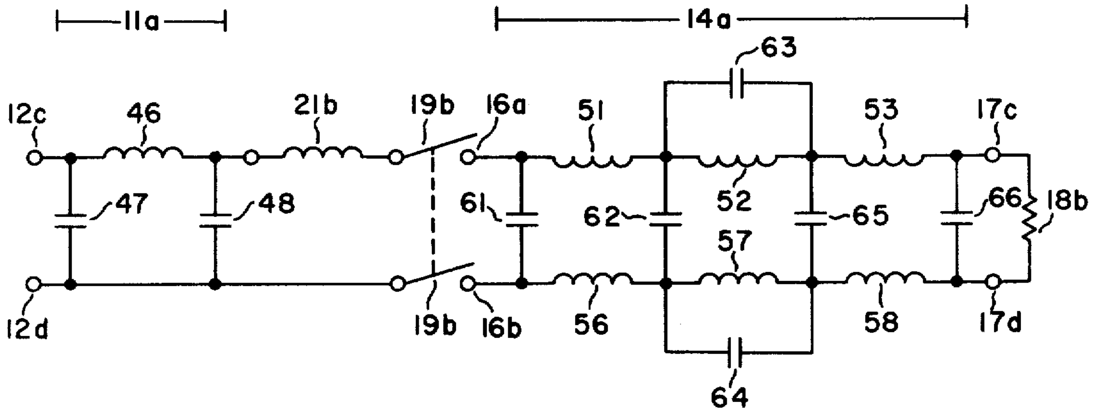
FIG. 3 is an electrical diagram of a portion of the circuit embodying a modified form of the invention.
Figure 4:
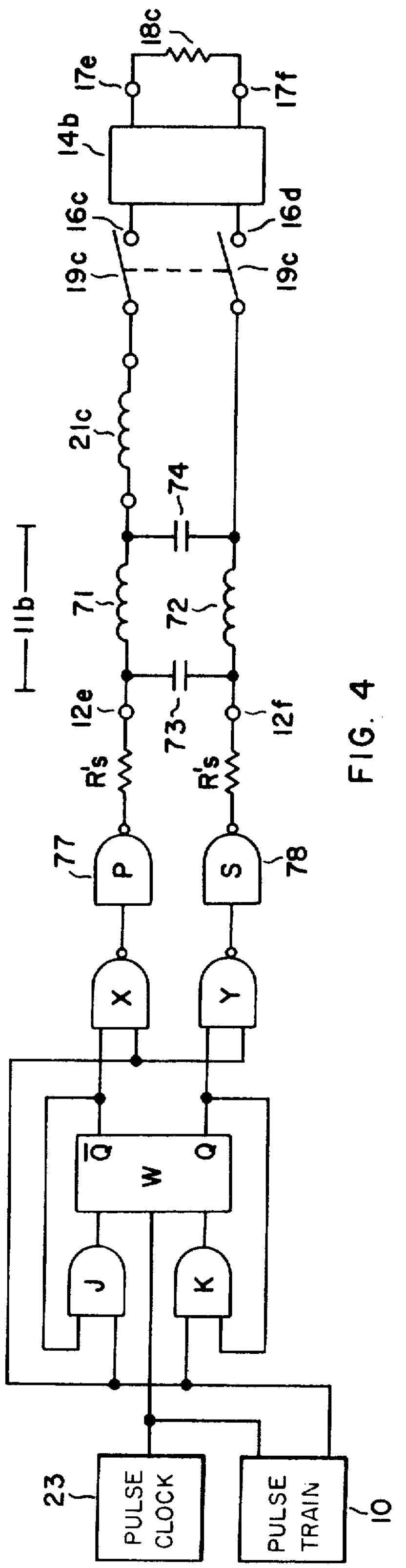
FIG. 4 is an electrical diagram showing a further modified form of the invention.

Several variations of the basic circuit are shown in FIGS. 2, 3, and 4. FIG. 2 shows a typical arrangement for operating with an unbalanced input 12*a* and 12*b*. Filters 11 and 14 can have one, two, three, or more coils. The choice depends on the out-of-band loss requirements of the system. In the present case, filter 11 uses two coils 31 and 32 and three capacitors 33, 34, and 35 connected as illustrated. Similarly, filter 14 includes two coils 36 and 37 and three capacitors 38, 39, and 40 connected in the same manner as in filter 11. Output terminals 17*a* and 17*b* are connected to transmission line 18*a*. Gate 19*a* and resonant transfer inductor 21*a* are connected as in the basic circuit.

FIG. 3 shows an arrangement for operating with an unbalanced input 12*c* and 12*d* and a balanced output 17*c* and 17*d* which is connected to the transmission line 18*b*. Filter 11a is here composed of a single coil or inductor 46 and a pair of capacitors 47 and 48. The wave shaping filter 14*a* is here composed of three two-winding coils in a balanced configuration, windings 51 and 56; 52 and 57; and 53 and 58; and six capacitors 61, 62, 63, 64, 65 and 66 connected as illustrated. The resonant transfer inductor 21*b* and a double-pole gate 19*b* are connected as shown.

In both of the configurations illustrated in FIGS. 2 and 3, the gate is presumed to be operated at a frequency $F_s$. The filters designed for resonant transfer will have, as above noted, a 3 dB cut-off at $F_s/2$. The pulse train input, as previously described, will be a square wave with an amplitude one or zero corresponding with the binary information. If the pulse train has transitions, i.e., a clock frequency coinciding with the gate signal $F_s$, the output signal will be duobinary or three-level type, as above explained. If the pulse train transistions occur at $F_s/2$, the output is a binary signal.

FIG. 4 shows a bipolar transmitter. Again, the filter arrangements can have one or more coils, the only requirement being that the designs be suitable for resonant transfer operation. Output filter 14*b* is here shown of the same balanced output configuration as in FIG. 3. Input filter 11*b*, however, is of a one-coil balanced input type having a coil winding in each leg, windings 71 and 72 and a pair of capacitors 73 and 74. The resonant transfer inductor 21*c* and two-pole gate 19*c* are connected in series between the two filters as in the basic circuit. Gate 19*c* is operated at at least twice the pulse clock frequency as in the case of the binary signal above described.

Mounted ahead of the first filter 11*b* is a circuit, including a flip-flop W, a plurality of gates J, K, X, and Y, and inverting gates 77 and 78, and pulse clock means 23, the circuit effecting an inversion of polarity of alternate logical ones as applied to the input terminals 12*e* and 12*f*. Preferably, filter 11*b* is a lowpass filter.

The operation of the bipolar inverting circuit is as follows: the clock signal from clock means 23 is fed to flip-flop W at equal to or less than one-half of the sampling frequency of gate 19*c*. The flip-flop is connected so that it will toggle if the data input is a one. Thus, for successive one inputs W will toggle, and the pulse train connected to the gates enables gates X and Y. However, only one of the two gates has a one input from the output of flip-flop W, see feedback from output $\overline{Q}$ to gate J and the feedback from output Q to gate K. This results in a zero output which is converted into a one by the following inverter 77–78.

For a zero input, both gates X and Y and the flip-flop W are inhibited. Thus, W does not toggle and the output of both inverters is zero. The inverters may be TTL gates which have low output resistance in both the ZERO and ONE states. These output resistances are built out to match the filter input at 12*e* and 12*f* by means of resistors $R_s'$.

In more detail, if the pulse train input is a one, flip-flop W changes state from set to reset or vice versa putting a one onto gate X or Y from Q or $\overline{Q}$. If a one appears at $\overline{Q}$, it enables gate X since there is a concurrence of ones in the pulse train at $\overline{Q}$. X is an inverting gate so that its output is zero. However, it is followed by another inverting gate 77 which then outputs a one to input 12*e*. At the same time, output Q is zero so that gate Y is disabled and this gate outputs a one which results in a zero output from inverter gate 78 and which is applied to filter input 12*f*. If there is a consecutive chain of ones in the pulse train, the filter will see a consecutive chain of ones alternately on the two input terminals 12*e* and 12*f*. A zero input puts a zero on both gates X and Y which puts ones on the output of both X and Y and zeros on the two filter input terminals 12*e* and 12*f* due to the following inverting gates 77 and 78. Accordingly, there can be three conditions: a one at terminal 12*e* and zero at 12*f;* a zero at 12*e* and a one at 12*f;* or a zero at both 12*e* and 12*f*.

The clock pulse from clock 76 activates flip-flop W. It requires two ones at the J input to set the flip-flop, i.e., to put a one out at Q; or two ones on the K input to reset it and to put a one out at the $\overline{Q}$ output. As above noted, $\overline{Q}$ is tied around to the J input, and the Q output is tied around to the K input so that it gets ready to toggle. Accordingly, a one in the pulse train controls the toggling. Whenever there is a one in the pulse train, the flip-flop toggles, and whenever there is a zero in the pulse train, the flip-flop is disabled. This occurs synchronously with the pulse clock signal so that every time there is a clock pulse from 23, there is a new input pulse which is seen as either a zero or one.

Figure 6:
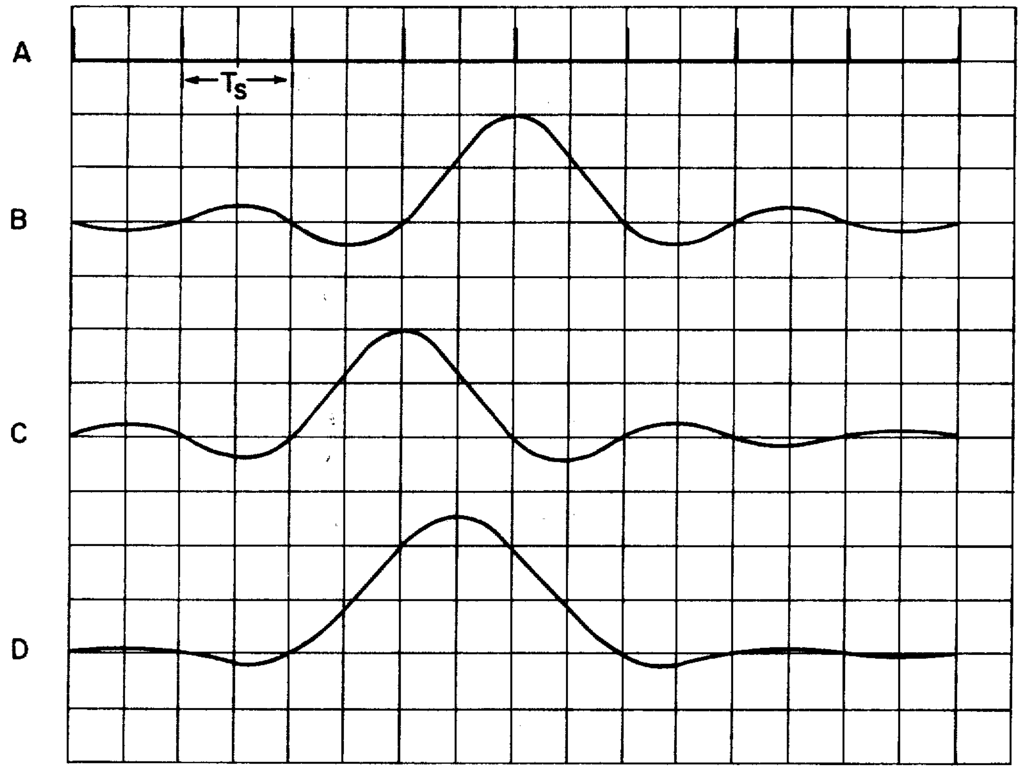
FIG. 6 is a graphic representation of binary and bipolar output waveforms.

The type of waveform produced by the resonant transfer filter 14 is indicated in FIG. 6 by the sin x/x shaped pulse (B). It will be noted that this wave has amplitude zeros at multiples of the gate clock (6A). Recalling that signals at output 13 which meet the Nyquist criterion will be sampled at least twice per cycle, it is typical that a line pulse at 18 might consist of the sum of two adjacent impulse responses (6B) and (6C) as shown in (6D). Note that the line signal pulse at 18 also has zeros at multiples of the gate interval and, indeed, has less overshoot in the "tails."

Figure 7:
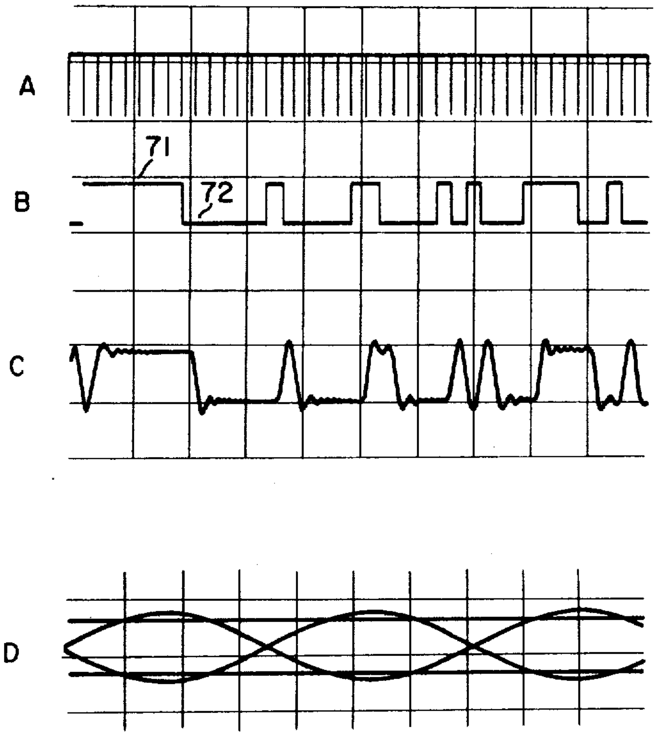
FIG. 7 is a graphic representation of the input pulse train and line waveforms of the circuit operating in a binary mode.

The performance of the pulse shaping circuit described herein for random pulse train input signals is depicted in FIG. 7. The 4 kHz pulse clock output is shown at FIG. 7A. The random input pulse train as applied at input 12 of filter 11 is shown at FIG. 7B. This random pulse train was obtained from a pseudo-random pulse generator such as is described in "Digital Communications with Space Applications" by S. Golomb, Prentice-Hall, 1964. Line 71 represents a series of one inputs as contrasted to line 72 which represents a series of zero inputs. The random nature of the following ones and zeros will be seen in FIG. 7B. The output signal appearing at output 17 and line 18 is shown in FIG. 7C, where as will be noted, the continuous waveform representation of the random pulse sequence of line 7B will be apparent. The general high quality of the signal, FIG. 7B, may be observed from the cleanly defined eye pattern seen in FIG. 7D, which is obtained by an overlay of successive portions of the signal shown in FIG. 7C. As will be understood by those skilled in the art, the cleanly defined and open eye pattern, FIG. 7D, is a measure of the high quality of the preferred waveform and enables the location of requisite decision points, the eye centers, at the receiving end of the system.

Figure 8:
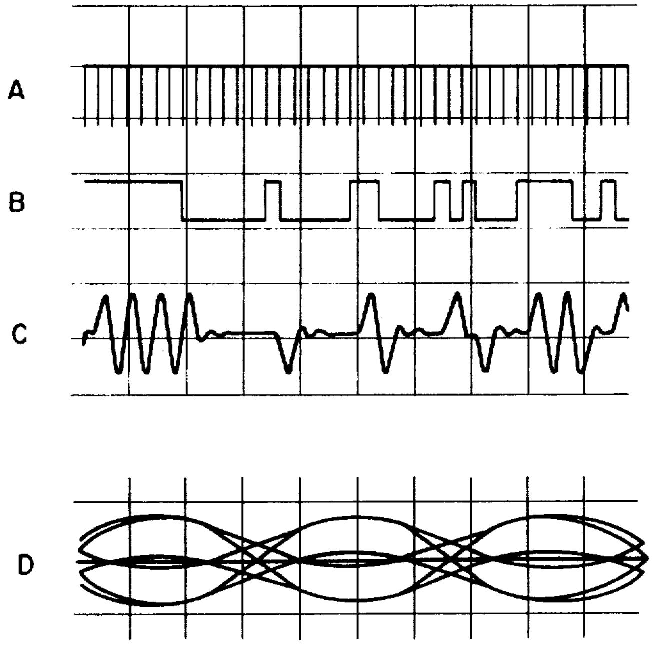
FIG. 8 is a graphic representation of the input pulse train and line waveforms of the circuit operating in the bipolar mode.

As mentioned previously, the timing relationships used for binary signal generation are also suitable for the production of bipolar line signals. The objective is to eliminate the dc component present in the binary signal spectrum. This is accomplished by letting each zero in the pulse train produce a zero voltage line signal and by having the ones in the pulse train produce sequentially, equal and opposite polarity shaped pulses. Such a bipolar output is indicated in FIG. 5G. The actual shape of the output waveform is more nearly approximated by the waveform shown in FIG. 6D, except that the polarity is to be alternately changed. The resulting line waveforms in the bipolar mode are shown in FIG. 8C for the pulse train of FIG. 8B. Here again, the 4 kHz pulse clock output is shown at FIG. 8A. The random pulse train obtained as hereinabove explained, is shown at FIG. 8B, the portion of the pulse train being substantially the same portion as that appearing at FIG. 7B. The output signal is shown at FIG. 8C where the inversion of successive ones will be apparent by comparison of the waveform FIG. 8C with that shown in FIG. 7C. The eye pattern of the bipolar signal, 8C, is shown at FIG. 8D where the cleanly defined and open 2-level eye segments can be observed. As will be understood, the decision points used at the receiving end of the apparatus are located at the centers of the upper and lower eye segments.

Figure 5:
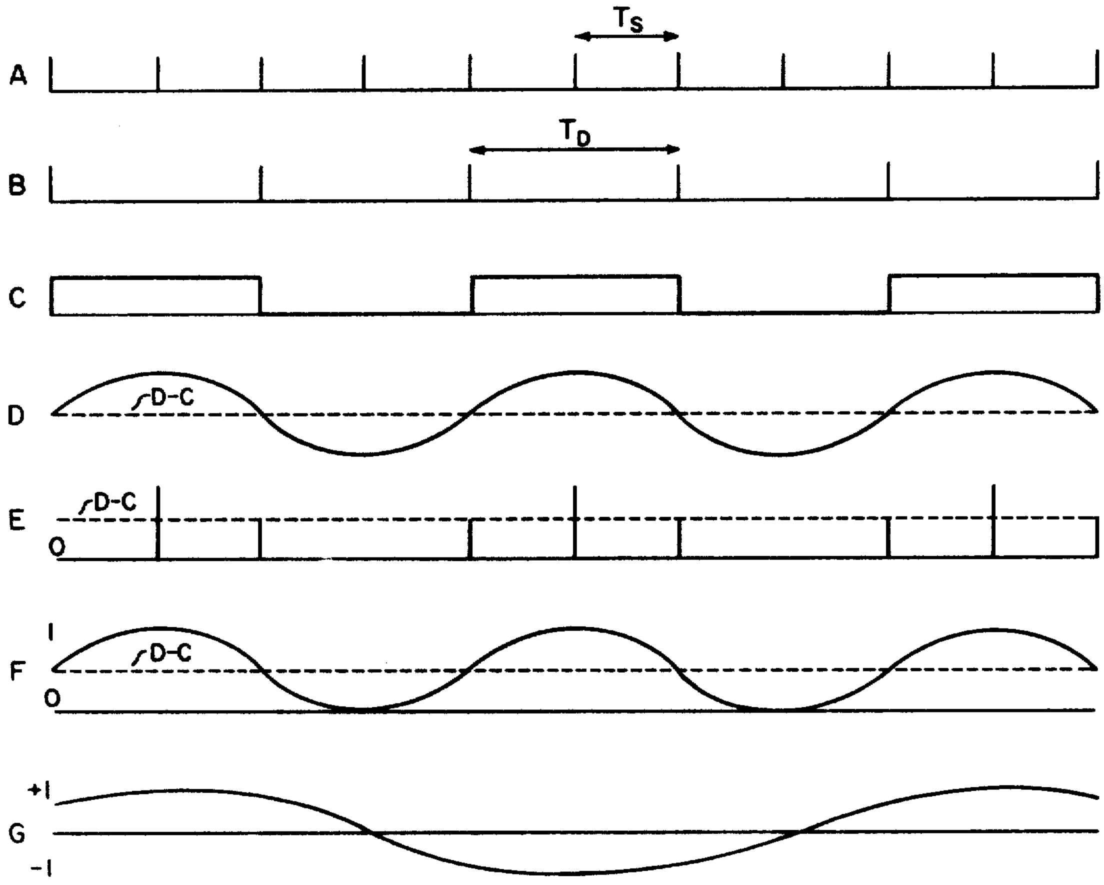
FIG. 5 is a graphic representation of the operation of various components of the present system and resultant waveforms, operating in the binary and bipolar modes.
Figure 9:
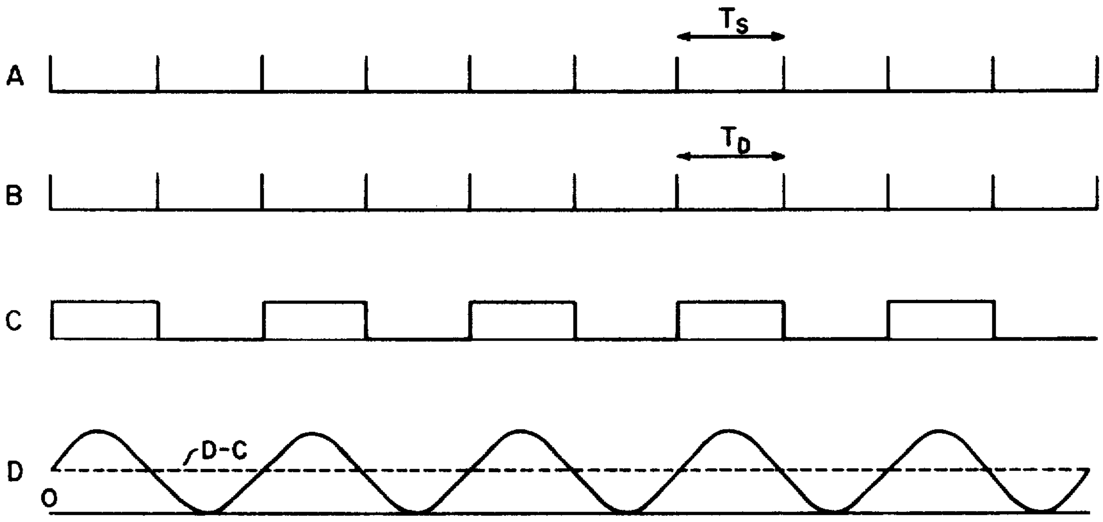
FIG. 9 is a graphic representation of the gate and the pulse clocks, and input and output waveforms for an alternating one-zero input pulse train for a circuit operating in a duobinary mode.

The basic circuit of FIG. 1 may also be used, as above noted, for generating duobinary signals. The only requirement for this is to use the same pulse clock rate for the pulse train as is used for operation of the gate 19. This relationship is indicated in FIGS. 9A and 9B. Preferably also the wave shapes are formed so that the amplitude will be one-half of peak value at ±T/2. The highest frequency fundamental which can be applied is from a 1 – 0 pulse train sequence. This sequence is shown in FIG. 9C and the fundamental is shown in FIG. 9D. Since the fundamental frequency is equal to $F_s$, it does not pass through filter 11 which cuts off, i.e., 3 dB loss, at $F_s/2$. Thus, for a simple 1 – 0 or 0 – 1 transition, only samples of the dc or average signal level are applied to the sampling gate. Signals other than the simple 1 – 0 or 0 – 1 transition must by definition contain more than a single consecutive one or zero. These signals contain frequencies which readily pass through filter 11 and behave in a manner similar to that given in connection with FIG. 5. The output waveform resulting from an arbitrary pulse train input then is a three-level signal. It has one and zero levels as indicated in FIG. 5F whenever more than a single one or zero occur consecutively, and it has a dc level response whenever a 1 – 0 or 0 – 1 transition occurs. Decoding to obtain the original pulse train, as per common practice with duobinary signals, is required.

Figure 10:
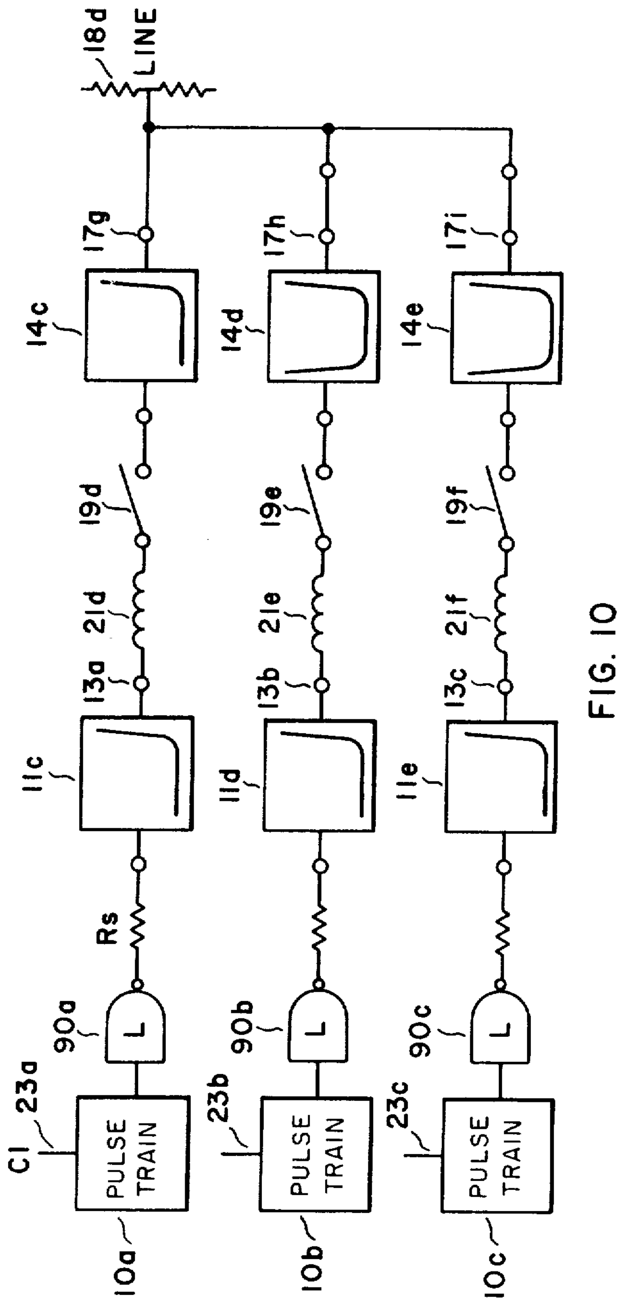
FIG. 10 is a basic circuit diagram showing how a number of pulse trains can be multiplexed.

An arrangement of pulse shaping circuits whereby multiplexing of a number of the binary, duobinary or bipolar waveforms may be obtained is shown in FIG. 10. Only three circuits for shaping the pulses of three separate pulse trains are shown in the figure, but, of course, this should not be construed as limiting the number of shaping circuits that can be combined using the techniques of my invention. The uppermost circuit, comprising pulse train 10*a*, amplifier or logic gate 90*a*, energy storage device 11*c*, gate 19*d*, and wave shaping filter 14*c* is arranged to operate at baseband since a lowpass filter is used. Filter 14*c* could as well be a bandpass filter if it is desired to suppress the low frequency components of the waveform. Each energy storage device 11*c*, 11*d*, and 11*e* is designed to bandlimit the pulse train so that the pulse width at output 13*a*, 13*b*, and 13*c* meets the Nyquist criterion with respect to the frequency $F_s$ as hereinabove explained. Each wave shaping filter 14*c*, 14*d*, and 14*e* is designed to operate in the resonant transfer mode as previously explained and in addition these filters select the portion of the frequency spectrum in which the binary, duobinary or bipolar signal will be transmitted.

For a discussion of a technique whereby multiplexing of voice frequency analog signals is attained, reference may be made to the article, "A New Method For Frequency-Division Multiplexing and its Integration With Time-Division Switching," P. M. Thrasher, IBM Journal 9, 137 - 140, 1965. Thus, at the output 17 – 17*g*, 17h, and 17*i* – the shaped waveforms are combined in a well-known manner for multiplex transmission over transmission line 18d. Thus, by using the techniques of my invention it is possible to effectively shape and to "modulate", i.e., locate the waveform in a particular portion of the frequency spectrum, in one step.

What is claimed is:

1. In a communications system having means for converting a pulse data train into waveforms for transmission, the improvement comprising a resonant transfer circuit arrangement having:
- an energy storage device having an input adapted for connection to said pulse data train and an output;
- a wave shaping filter compatible with said device for operation in a resonant transfer mode, said filter having impulse response zeros at multiples of said sampling frequency, and having an input and having an output adapted for connection to a transmission line;
- a. gate connecting the output of said device to said filter input;
- means for periodically closing and opening said gate at a sampling frequency to periodically transfer energy stored in said device as impulses to said filter;
- means providing a clock frequency for the pulse data train; and
- means controlling said clock frequency relative to said sampling frequency.

2. The improvement of claim 1, wherein said last-named means controlling said clock frequency at no greater than one-half said sampling frequency.

3. The improvement of claim 1, wherein said last-named means controlling said clock frequency to equal said sampling frequency.

4. The improvement of claim 3, said filter providing a waveform having approximately one-half its peak value at one-half of the sampling interval.

5. The improvement of claim 2, said energy storage device being a lowpass filter.

6. The improvement of claim 2, said last named means comprising:
- a circuit including a flip-flop, a plurality of gates, and a clock pulse means operated in synchronism with said data train clock frequency for inverting the polarity of alternate logical ones applied to said storage device.

7. The improvement of claim 6, said storage device being a lowpass filter having a balanced input.

8. In a communications system a method for converting pulse data trains, having a clock frequency, into waveforms for transmission comprising:
- inputting data pulses to an energy storage means;
- effecting resonant transfer of energy from said means to a wave-shaping filter selected for compatibility with said means for operation in a resonant transfer mode; and
- controlling said clock frequency relative to said sampling frequency to selectively provide binary or duobinary signals at said filter output.

9. The method of claim 8, and
- controlling said clock frequency to be no greater than one-half said sampling frequency to produce binary signals at said filter output.

10. The method of claim 8, and
- controlling said clock frequency to equal said sampling frequency to provide duobinary signals to said filter output.

11. The method of claim 10, and
- shaping the waveform to be approximately one-half its peak value at one-half of the sampling interval.

12. Apparatus for converting and multiplexing a plurality of pulse trains into waveforms, which occupy predetermined portions of a frequency spectrum, for transmission comprising:
- a first resonant transfer circuit comprising;
- a first energy storage device having an input adapted for connection to a first pulse train and an output;
- a first wave shaping filter, compatible with said device for operation in a resonant transfer mode, having an input and an output adapted for connection to a transmission line, said first filter providing a first series of waveforms for transmission in a selected first portion of said frequency spectrum;
- a first gate connecting the output of said first device to said first filter input; and
- means for periodically closing and opening said first gate at a first sampling frequency to periodically transfer energy stored in said first device as impulses to said first filter; and
- at least one additional resonant transfer circuit comprising;
- a second energy storage device having an input adapted for connection to a second pulse train and an output;
- a second wave shaping filter, compatible with said second device for operation in a resonant transfer mode, having an input and an output adapted for connection to said transmission line, said second filter providing a second series of waveforms for transmission in a second portion of said frequency spectrum thus permitting simultaneous transmission with said first series of waveforms;
- a second gate connecting the output of said second device to the second filter input; and
- means for periodically closing and opening said second gate at a second sampling frequency to periodically transfer energy stored in said second device as impulses to said second filter.

13. The improvement of claim 12, said first filter having impulse response zeros at multiples of the first sampling frequency and said second filter having impulse response zeros at multiples of the second sampling frequency.

14. The improvement of claim 13, each said pulse train having a pulse clock frequency; and
- means controlling each pulse clock frequency relative to the sampling frequency for each to selectively provide binary or duobinary waveforms at the output of each filter.

15. The improvement in claim 14 wherein said waveforms at the output of at least one said filter are binary; and said last-named means controlling the pulse clock frequency associated with said one filter at no greater than one-half of the sampling frequency.

16. The improvement in claim 15, said first and second sampling frequencies being equal.

17. The improvement in claim 14, wherein said waveforms at the output of at least one said filter are duobinary; and said last-named means controlling the pulse clock frequency associated with said one filter to equal the sampling frequency.

18. The improvement in claim 17, said first and second sampling frequencies being equal.

19. The improvement of claim 17, said one filter providing a waveform having approximately one-half of its peak value at one-half of the sampling interval.

20. The improvement of claim 12, wherein each said energy storage device is a lowpass filter.

21. The improvement of claim 20, wherein only one of said wave shaping filters is a lowpass filter.

22. The improvement of claim 15, wherein said last-named means controlling the pulse clock frequency associated with at least one said filter further comprises:

a circuit including a flip-flop, a plurality of gates, and a clock means operated in synchronism with said pulse clock frequency for inverting the polarity of alternate logical ones applied to the associated storage device.

23. The improvement of claim 22, said associated storage device being a filter which has a balanced input.

* * * * *